Patented July 17, 1928.

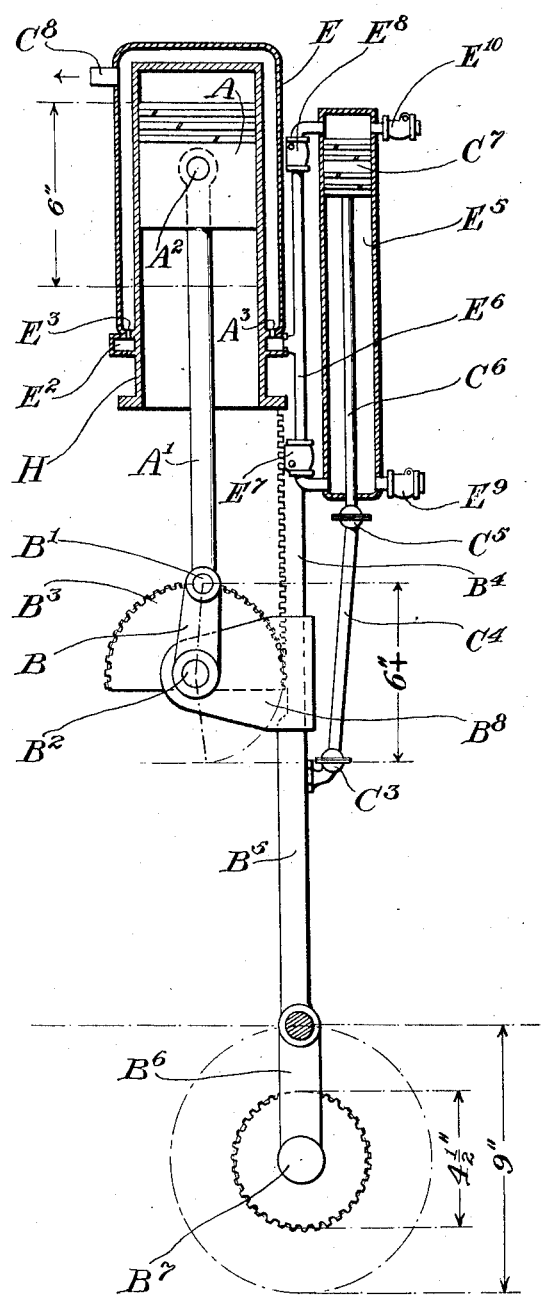

1,677,407

UNITED STATES PATENT OFFICE.

ALVAH LEIGH POWELL, OF CLEVELAND, OHIO, ASSIGNOR, BY MESNE ASSIGNMENTS, TO THE A. L. POWELL POWER COMPANY INCORPORATED, A CORPORATION OF MONTANA.

INTERNAL-COMBUSTION ENGINE.

Original application filed December 8, 1920, Serial No. 429,167. Divided and this application filed October 2, 1924. Serial No. 741,226.

My invention relates to improvements in internal combustion engines, but by a novel construction and arrangement of the power trasmission members, I am able to secure effects not obtainable with the transmission means now employed. I also secure more perfect combustion, greater uniformity of pressure, and a more positive control of speed. This application, which is a division of application Serial No. 429,167, filed December 8, 1920, relates in particular to the means for cooling the cylinders.

In practically all engines, particularly of the internal combustion class, the power is transmitted directly to the crank by a crank rod from the piston. In double acting engines, the usual cross head is introduced, following the principles of steam engine design. In all such engines, the strokes of piston and crank are equal but in my invention, this relation is made variable, for by interposing leverage between the piston and crank I can make the latter have a greater or lesser direct travel than the former. Superficially, it would appear that no direct advantage accrues from this, but an examination will disclose that effects are produced of prime importance, and that positive thermal gains are attained. This is specifically true of cylinder combustion. In any gas engine the conditions for combustion are imperfect. The piston speed is high; the stroke short. A percentage of previously burned gases is present. Perfect combustion would involve the complete reduction of the carbon in a hydrocarbon vapor to pure carbon dioxide; and the proper absorption of the heat thereby developed into mechanical effect would represent the highest efficiency possible. As a matter of fact this is the theoretical basis of the gas engine as a source of power, but it is an ideal never attained, for not only is the exhaust from such engines composed of a mixture of carbon dioxide and carbon monoxide, but a percentage of live fuel (hydro-carbon vapor), and unconsumed oxygen are present. Normally, combustion improves with compression, because the fuel is in more intimate relation to the oxygen of the air and, the temperature developed immediately after ignition being higher, the approach of the unconsumed oxygen to a condition of nascence, insures its quicker and more perfect union with the carbon of the fuel. This will favor the production of carbon dioxide, as against that of monoxide, and greater heat will be imparted to the confined charge, the general thermal efficiency consequent upon more perfect combustion naturally being increased. Various means have been employed to reach this perfection, the most important of which are those used in the Diesel engine. In this, fuel is introduced into a heat body of relatively pure air, where it is automatically consumed gradually, through the combustion stroke. The efficiency of these engines is high, for combustion is more perfect, expansion is in proportion to stroke, and an ideal diagram is shown on the indicator card. Two factors conduce to this: the initial condition of the air; that is, its purity and mechanically effected temperature and compression; and the greater length of piston stroke for a given cylinder diameter, this relatively increasing the time of such expansion, and affording a larger interval for complete combustion.

An effect equivalent to this can be reached or approximated to by controlling the piston speed, with reference to crank travel. This I accomplish by establishing a difference between them. Let it be assumed that a leverage is placed between a piston and crank, the former having a stroke of six inches and the latter three. Ignoring friction, the conditions for maximum speed on the part of the piston will be favorable, because the effect will be the same as applying the force of a large engine to the crank shaft of a small one. The piston will move freely towards its limit, but the volume of the explosion chamber will increase faster than the temperature of the enclosed gases rises, and the pressure will fall at a corresponding rate. Combustion will be less perfect, for the decline of pressure weakens the conditions for chemical combination, and the percentage of monoxide over dioxide (of carbon) will be greater than would have been the case with a higher average pressure. Let these conditions be reversed. Allow the levers to be arranged to give a crank throw of nine inches from a piston stroke of six. It is evident that the time of stroke of piston will always equal that of crank, with reference to total length, but the actual distance traversed by the crank-pin will be more than that of the piston, and the average speed will be different.

The pressure on the crank will be in proportion to that of the piston, and the actual piston speed will vary with the crank load. But a leverage will exist between these factors of approximately 2:3, in favor of the crank. The back pressure from the crank will therefore react against the piston in this proportion. The theoretical reaction of the piston against the crank will have this leverage to overcome, the result being that a permanent retarding effect against the piston will exist. This retarding will even be present when the engine is running free from load, the weight effect of the moving parts being magnified. On combustion, the effect will be to hold the piston to the expanding gas; that is, expansion will always be against a positive load that will steady the action of the piston. The push on the latter will be more uniform. The mass of gas and air will combine more evenly under conditions that amount to a compressing effect throughout stroke, the heat turned into work will be greater, because the average temperature will be higher, and a richer charge can be consumed. This is practically the condition maintained in any gas engine when it is running near its limit, as to load. Paradoxically, it is then nearest failure, for when the crank pressure has risen to a given point the piston slows down to the danger point, and the engine stops. But with my construction, the differential relation between crank and piston will establish a pressure conducive to advantageous combustion, independent of the working load on the crank shaft. It is not to be understood from this that such an engine will not stop on excessive overload, but it will always show greater flexibility, and its average efficiency will be higher.

The indirect consequences of a differential relation between piston and crank movement have been ignored in this statement, but will be taken up in the actual description.

In the accompanying drawing:

Figure 1 is a vertical elevation of my improvement, given in section.

The cylinder H is enclosed by a cooling jacket E, which communicates with an annular chamber $E^2$, by means of ports $E^3$, $A^3$, which chamber $E^2$ connects with an auxiliary cylinder $E^5$, through a pipe $E^6$. In this pipe are valves $E^7$, $E^8$, operable as hereinafter to be described. In the cylinder $E^5$ are two inlet valves $E^9$, $E^{10}$. In cylinder H is a piston A, from which is suspended a connecting link $A^1$ on a wrist pin $A^2$. On a pin $B^2$ are mounted a crank B and a segmental pinion $B^3$. The pin $B^2$ is preferably supported in the engine frame. The crank B is attached to the link $A^1$ by a pin $B^1$. The crank and segmental pinion are keyed to the pin $B^2$, as shown. The segmental pinion meshes with a rack $B^4$, which forms part of a crank rod $B^5$, the latter connected with the engine crank $B^6$ by a pin in any conventional way. On the rack section of the crank rod, a movable retaining member $B^8$ is formed to fit the back of said rod, and is rotatably mounted on the pin $B^2$ by sides that extend from it to the pin, as clearly indicated in the drawing.

At a point $C^3$, a universal joint is attached to the connecting rod, this joint being on the end of a rod, $C^4$. At the opposite end is another universal joint $C^5$. From $C^5$ there extends a piston rod $C^6$, which passes through the end of the cylinder $E^5$ and is connected to a piston $C^7$ by any conventional means.

On the outstroke of piston A, the crank B causes the segmental pinion to impart its motion to the crank rod $B^5$, and the shaft turns in unison with the crank $B^7$.

The piston $C^7$ of the auxiliary cylinder moves downwardly with the movement of the power piston A. The inlet valve $E^{10}$ opens and allows air to enter, while the air in front of piston is partly compressed, not being able to pass the inlet valve $E^9$, and lifts the check valve $E^7$. This permits the compressed air to escape into the annular chamber $E^2$, from which it passes through the ports $E^3$, escaping by way of an outlet pipe at $C^8$. During its passage through the jacket, a cooling effect on the walls of the cylinder H is produced. This effect accompanies each stroke of the piston.

Many different arrangements can be made in the mechanism I have shown, and other means may be employed to accomplish the purposes herein set forth. I do not wish to be limited to the arrangement of parts which are shown by way of example.

I claim:

In combination with an internal combustion engine cylinder, a cooling jacket partly surrounding the cylinder, an inlet port for the jacket, a pipe extending above and below the said port and communicating therewith, an auxiliary cylinder having its ends connected with the ends of the pipe, a check valve in each end of the pipe, inlet valves for the auxiliary cylinder, a double acting piston slidable within the auxiliary cylinder, and means whereby the same may be actuated, said means including a connecting rod, a piston rod, and a universal joint between the connecting rod and the piston rod.

In testimony whereof I affix my signature.

ALVAH LEIGH POWELL.